United States Patent [19]

Covington et al.

[11] Patent Number: 5,097,754
[45] Date of Patent: Mar. 24, 1992

[54] AUTOMATIC AIR COOKING SYSTEM FOR VENDING MACHINES

[75] Inventors: Wayne L. Covington; Glen R. Green, both of Boise, Id.

[73] Assignee: Ore-Ida Foods, Inc., Boise, Id.

[21] Appl. No.: 594,382

[22] Filed: Oct. 9, 1990

[51] Int. Cl.[5] .............................................. A47J 37/04
[52] U.S. Cl. .................................... 99/357; 99/407;
99/408; 99/409; 99/427; 99/443 R; 99/447;
99/450; 99/476; 126/21 A; 219/389; 219/400;
392/379
[58] Field of Search .................... 99/427, 407, 443 R,
99/409, 447, 450, 467, 473, 476, 474, 418, 449,
483, 348, 357, 403, 408; 219/400, 399, 389;
392/379; 126/21 A

[56] References Cited

U.S. PATENT DOCUMENTS

| | | | |
|---|---|---|---|
| 1,649,488 | 11/1927 | Robinson et al. | 99/474 |
| 1,993,607 | 3/1935 | Kalgren . | |
| 2,004,775 | 6/1935 | Wright . | |
| 2,640,414 | 6/1953 | Jensen | 99/476 |
| 2,939,383 | 6/1960 | Kanaga . | |
| 3,643,404 | 2/1972 | Ronning | 99/646 L S |
| 3,762,394 | 10/1973 | Newcomer | 99/403 |
| 3,870,193 | 3/1975 | Schneider . | |
| 3,943,841 | 3/1976 | Huang | 99/470 |
| 4,068,572 | 1/1978 | Vogt . | |
| 4,155,294 | 5/1979 | Langhammer et al. | 99/427 |
| 4,203,358 | 5/1980 | Vogt . | |
| 4,374,318 | 2/1983 | Gilliom . | |
| 4,375,184 | 3/1983 | Gilliom . | |
| 4,421,018 | 12/1983 | Pryputsch et al. | 126/21 A |
| 4,439,459 | 3/1984 | Swartley . | |
| 4,502,372 | 3/1985 | Mariotti . | |
| 4,503,760 | 3/1985 | Pryputsch et al. | 99/476 |
| 4,505,193 | 3/1985 | Mariotti . | |
| 4,700,685 | 10/1987 | Miller . | |
| 4,701,334 | 10/1987 | Durth . | |
| 4,722,267 | 2/1988 | Galockin et al. . | |
| 4,763,572 | 8/1988 | Kuehl | 99/483 |
| 4,800,806 | 1/1989 | Durth . | |
| 4,817,509 | 4/1989 | Erickson . | |
| 4,854,949 | 8/1989 | Giles, Sr. et al. | 99/403 |
| 4,865,864 | 9/1989 | Rijswijck . | |
| 4,949,879 | 8/1990 | Mariotti . | |

FOREIGN PATENT DOCUMENTS 2448402  4/1976  Fed. Rep. of Germany .
2448403  4/1976  Fed. Rep. of Germany .

Primary Examiner—Timothy F. Simone
Attorney, Agent, or Firm—Burns, Doane, Swecker & Mathis

[57] ABSTRACT

A closed-loop air cooking system for use in a vending machine that vends french fried potatoes and the like, including: a) a closed-loop air duct assembly; b) a cooking basket mounted for rotation within the air duct assembly; c) a fan for forcing air through the air duct assembly; d) a separator for removing entrained particulates from the air stream within the air duct assembly; and e) a heater for heating air that circulates within the air duct assembly. In addition, the cooking system includes a separator for removing oil and other particulates from the closed-loop air stream.

28 Claims, 5 Drawing Sheets

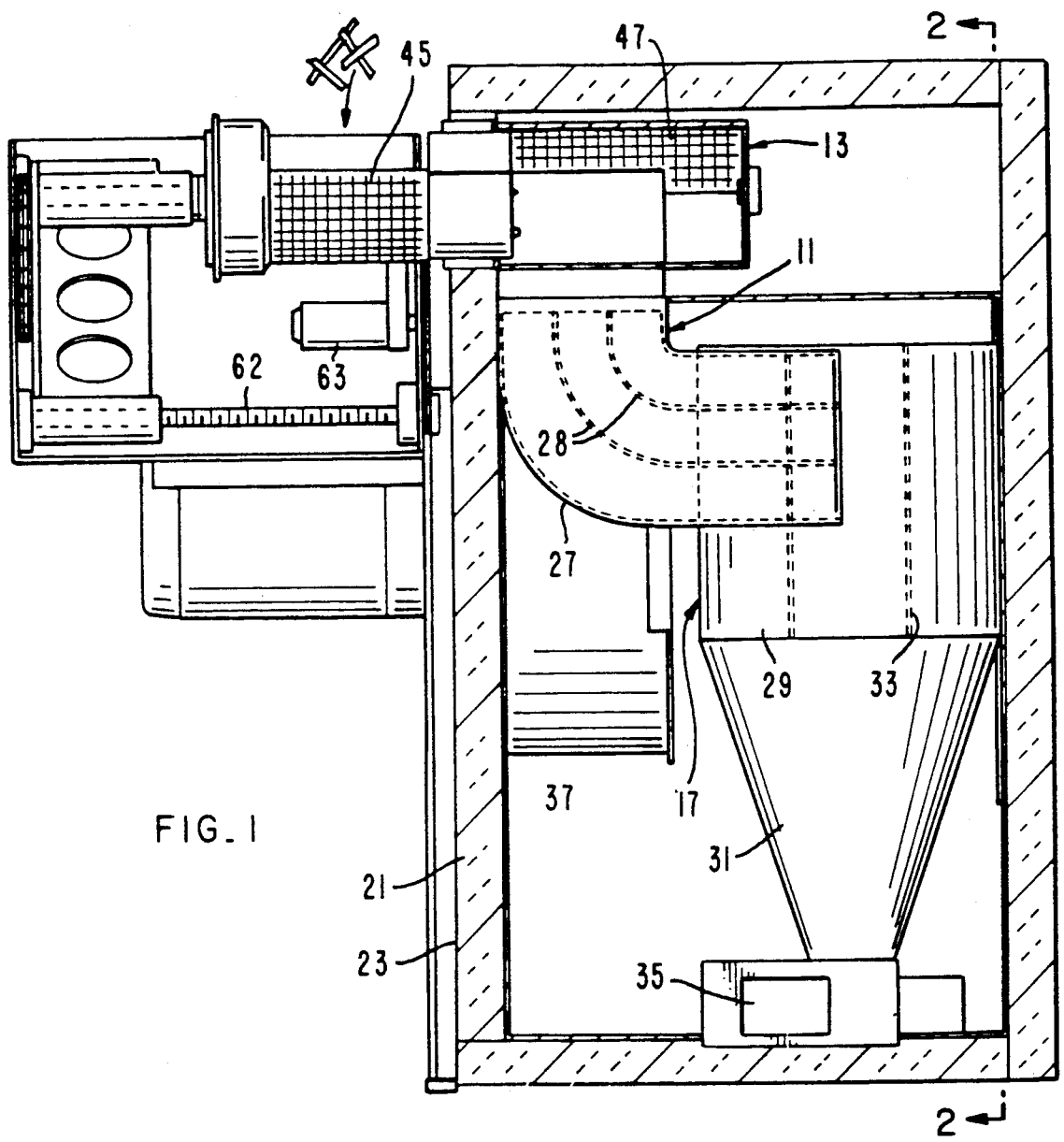
FIG_1
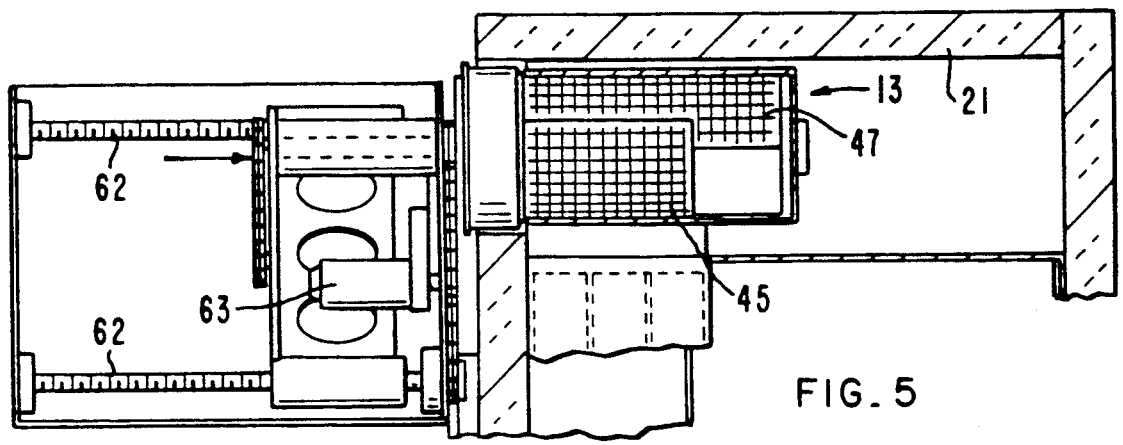
FIG_5

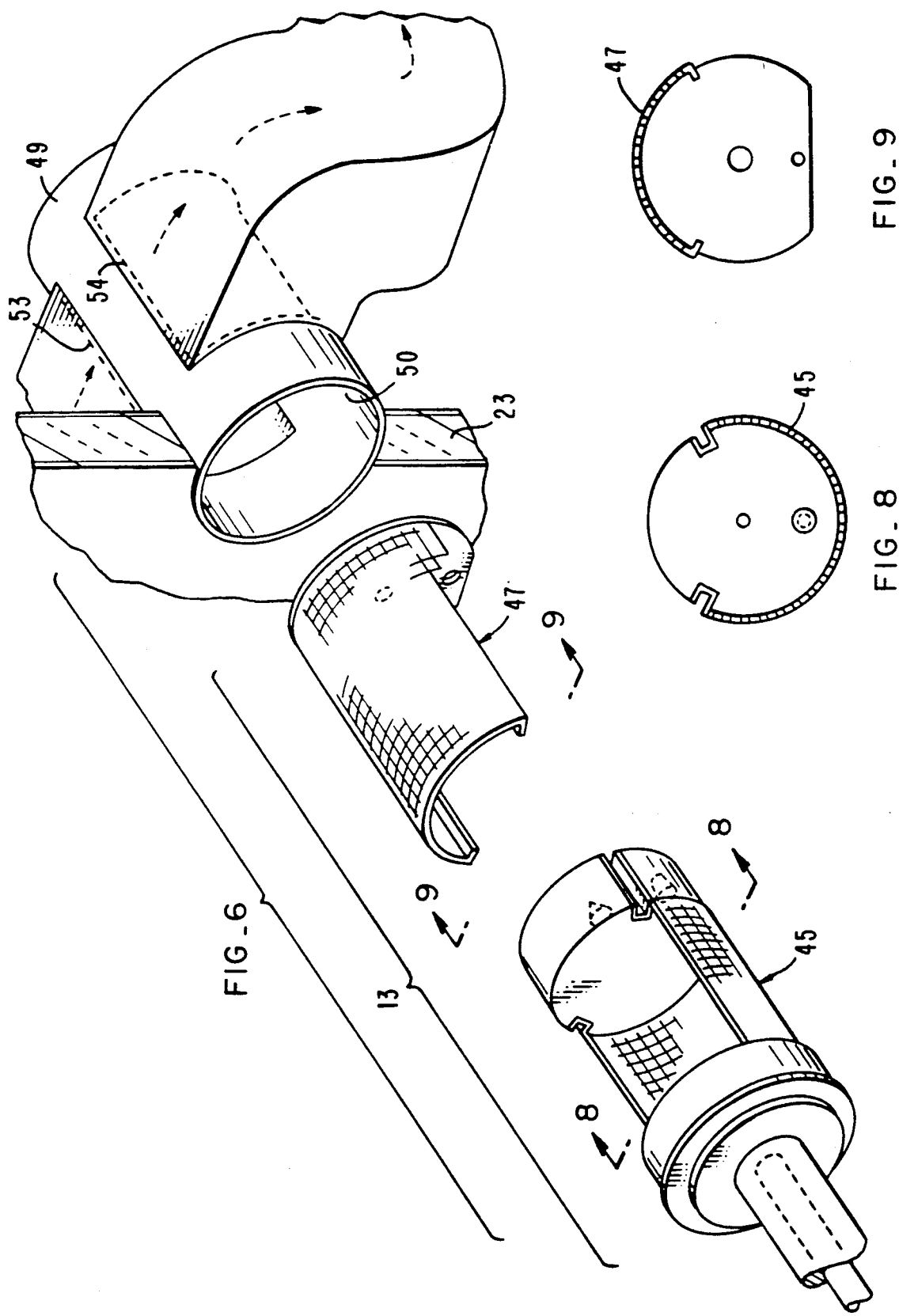

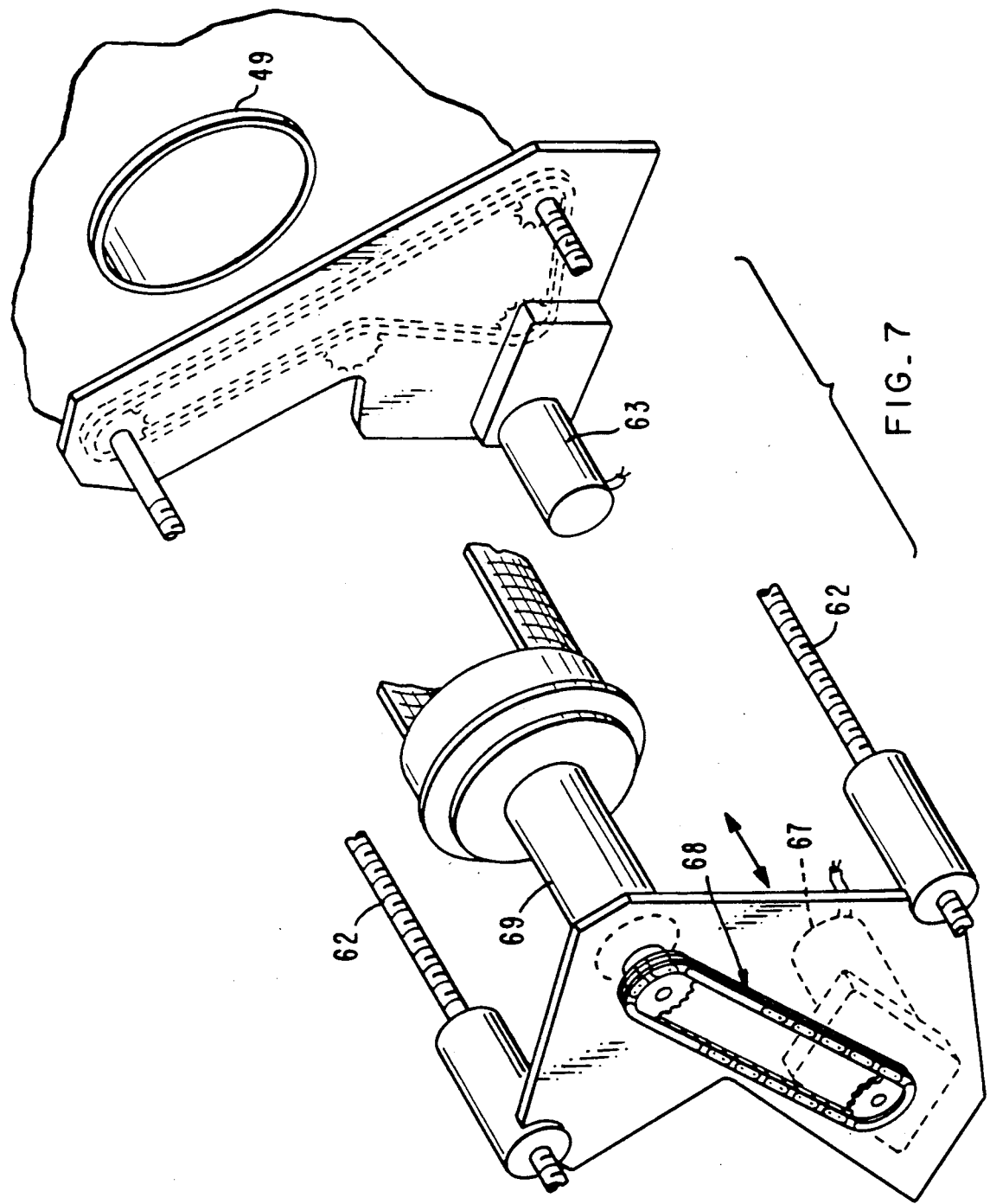

5,097,754

1

AUTOMATIC AIR COOKING SYSTEM FOR VENDING MACHINES

BACKGROUND OF THE INVENTION

1. Field of the Invention

The present invention generally relates to cooking systems for use in vending machines that vend cooked foods such as french fried potatoes and the like.

2. State of the Art

Various machines have been proposed for vending cooked foods. Generally speaking, those vending machines provide a heated cooking medium such as hot oil or hot air, and may include an energy source such as infrared or microwave energy. However, all of the prior art devices have one or more of the following shortcomings:

a. Extended cooking time (e.g., 35 seconds or more);
b. Oiliness of the final food product;
c. Non-uniformity of cooking throughout a serving;
d. Non-uniformity of color of the cooked food item (e.g., burnt ends and the like on french fried potatoes);
e. Inconsistency of texture of the cooked food item (e.g., french fried potatoes that lack a crisp but tender surface and that have oily or mushy interiors);
f. Substantial residue of oil in delivered servings; or
g. Strong exhaust or burnt odors during normal operation.

SUMMARY OF THE INVENTION

Generally speaking, the present invention provides a closed-loop air cooking system for use in a vending machine that vends french fried potatoes and the like. In the preferred embodiment, the closed-loop air cooking system includes the following major components: (a) a closed-loop air duct assembly; (b) a cooking basket means mounted for rotation within the air duct assembly; (c) fan means for forcing air through the air duct assembly; (d) separator means mounted for removing entrained particulates from the air stream that circulates within the air duct assembly; and (e) heating means for heating air that circulates within the air duct assembly. In addition, the cooking system includes a separator means for removing oil and other particulates from the closed-loop air stream. In operation, the separator prevents particulates from reaching the heating system, thereby minimizing cooking odors.

In operation of the closed-loop air cooking system, the basket assembly is filled with a serving portion of french fried potatoes or the like, and rotated in the heated air stream for a predetermined period at a generally constant rotational speed (e.g., twenty revolutions per minute) to uniformly expose the serving portion to the heated air stream. The air velocity impinging upon the serving portion during the cooking cycle is controlled at about 2200 ft/min with a volumetric flow rate of about 378 cubic feet per minute (cfm) at about 455 to 465 degrees Fahrenheit to promote rapid cooking without smoking. At the air velocity of about 2200 ft/min, french fried potatoes cook to have delicate and crisp outer layers with moist and hot interiors. Also, the air velocity of about 2200 ft/min is sufficient to entrain loose oil from the fried potatoes, leaving them essentially dry to the touch.

2

BRIEF DESCRIPTION OF THE DRAWINGS

The present invention can be further understood with reference to the following description in conjunction with the appended drawings, wherein like elements are provided with the same reference numerals. In the drawings:

FIG. 1 is a side view of a cooking system according to the present invention, with the insulation and other components partially cut away for clarity;

FIG. 5 is a side elevation, partially cut away, showing the basket assembly of FIG.. 4 in an extended position;

FIG. 6 is an exploded pictorial view of the basket assembly of FIG. 2;

FIG. 7 is a pictorial view of a mechanism for reciprocatively driving and rotating the cooking basket assembly of FIG. 6; and, FIGS. 8 and 9 are details of the basket assembly, taken along the section lines 8—8 and 9—9, respectively, in FIG. 6.

DETAILED DESCRIPTION OF THE PREFERRED EMBODIMENT

Figure 3:
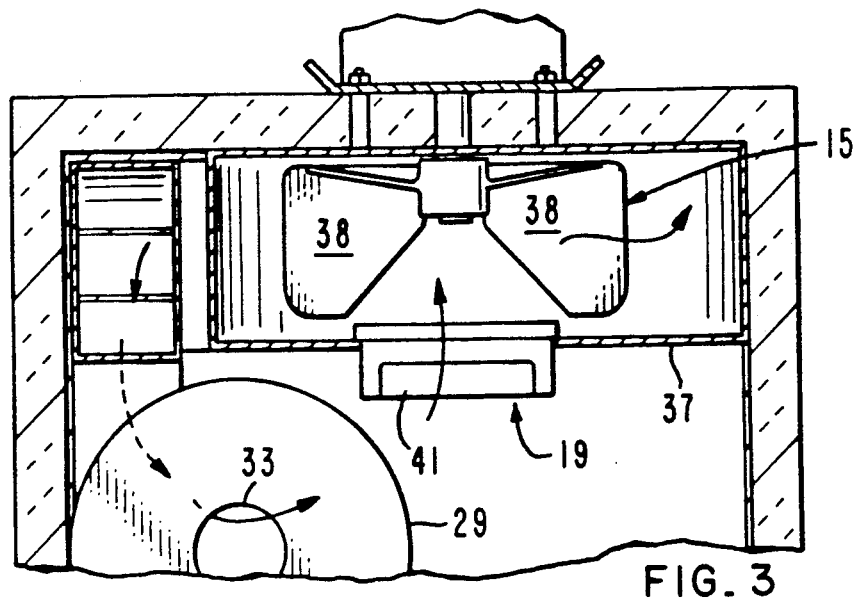
FIG. 3 is a top view, partially cut away, of the cooking system taken along the section line 3—3 in FIG. 1.

Generally speaking, the major components of the closed-loop air cooling system in FIG. 1 include a closed-loop air duct assembly 11, a rotary basket assembly 13 mounted for rotation within the air duct assembly, a fan 15 for forcing air through the air duct assembly, a centrifugal separator 17 mounted for removing entrained particulates from the air stream that circulates within the air duct assembly, and heating system 19 for heating the air stream that circulates within the air duct assembly. The above-listed components are surrounded by a layer 21 of insulation material and are enclosed in a housing 23.

The closed-loop air cooking system is primarily intended for use in a vending machine which is connected to a storage freezer. In practice, an automatic weighing system is connected to meter serving portions as they are removed from the storage freezer for cooking. Typically, the vending machine would include trays, chutes, drives, and other conventional components which are necessary for operation.

Figure 2:
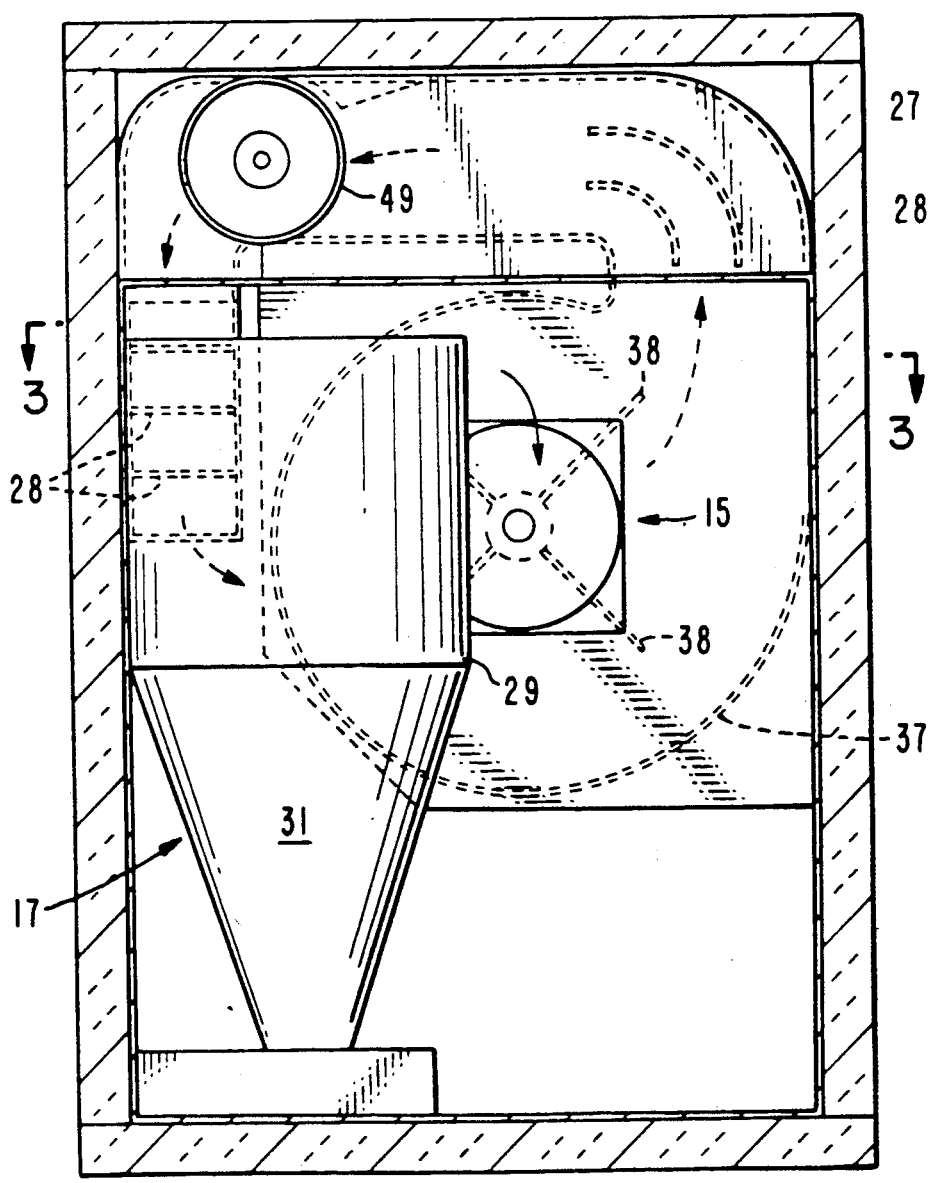
FIG. 2 is an end view of the cooling system of FIG. 1, again with the insulation and other components partially cut away for clarity.

Referring now to FIGS. 1 and 2, it can be seen that centrifugal separator 17 is embodied as a cyclone separator. As such, the separator includes an inlet scroll member 27, containing turning vanes 28, a generally cylindrical body 29 which is connected for receiving the air stream from scroll member 27, a frusto-conical member 31 mounted in communication with the lower part of cylindrical body 29 for receiving the heavier fraction of materials that were entrained in the air stream. The cyclone separator also includes an inner cylindrical outlet member 33 which is mounted in communication with the interior of cylindrical body 29 for discharging the main flow of cleaned air from the cyclone separator. As such, the cyclone separator can be recognized as being of generally conventional design.

In operation of centrifugal separator 17 of FIG. 1, scroll member 27 receives air flow from the duct member 11 and carries the flowing air into cylindrical body 29, where the air circulates in a swirling pattern so that entrained particulates impinge upon the interior peripheral wall of body 29. The impinging particles then fall downward into frusto-conical member 31 for subsequent removal from the separator via a secondary discharge spout 35 at the bottom of the frusto-conical member. The main air flow, with the particulates removed, leaves the top of the separator via cylindrical outlet member 33. Accordingly, centrifugal separator 17 prevents contaminants, such as oil or carbonized particulates such as broken pieces of potato, from being entrained by the air stream and carried back through the eating elements where overheating and smoking could occur. It should be noted that the main air stream, upon leaving the cyclone separator, is still enclosed by housing 23.

As best shown in FIGS. 2 and 3, fan 15 includes a shroud 37 and a set of rotary fan blades 38. These components are mounted within housing 23 to draw the cleaned air flow leaving centrifugal separator 17 via outlet member 33. The fan blades 38 drive the cleaned air into the closed-loop air duct assembly 11. Once in the duct assembly, the air passes through the rotary basket assembly 13 and returns to centrifugal separator 17.

In the preferred embodiment as shown in FIG. 3, the heating system 19 comprises electrical heating elements 41 which are mounted near the inlet to fan 15. As so positioned, heated air is uniformly mixed into the circulating air stream. Also, heat from the heating elements is radiantly absorbed by the walls of centrifugal separator 17, thereby providing radiant heating of the air mass circulating through the closed-loop system. In other words, the body of the centrifugal separator serves as a heat sink and provides a source of instantaneous thermal energy. Preferably, the heating system 19 is sufficiently energetic to allow the temperature of the circulating air to be elevated to approximately 800° Fahrenheit for a prolonged time period (e.g., one hour) so that the closed-loop system can clean itself.

As mentioned above, housing 23 is insulated to minimize heat loss to the cabinet enclosure. In practice, the insulating layer 21 is a 1.5 inch (approximately) thick layer of "insul-thin" material. As so insulated, heat flow from the closed-loop system is approximately one-half BTU per minute per square foot. It should be understood that the insulation layer has openings for the cooking basket assembly to move through, and an opening for the waste material to be discharged.

Figure 4:
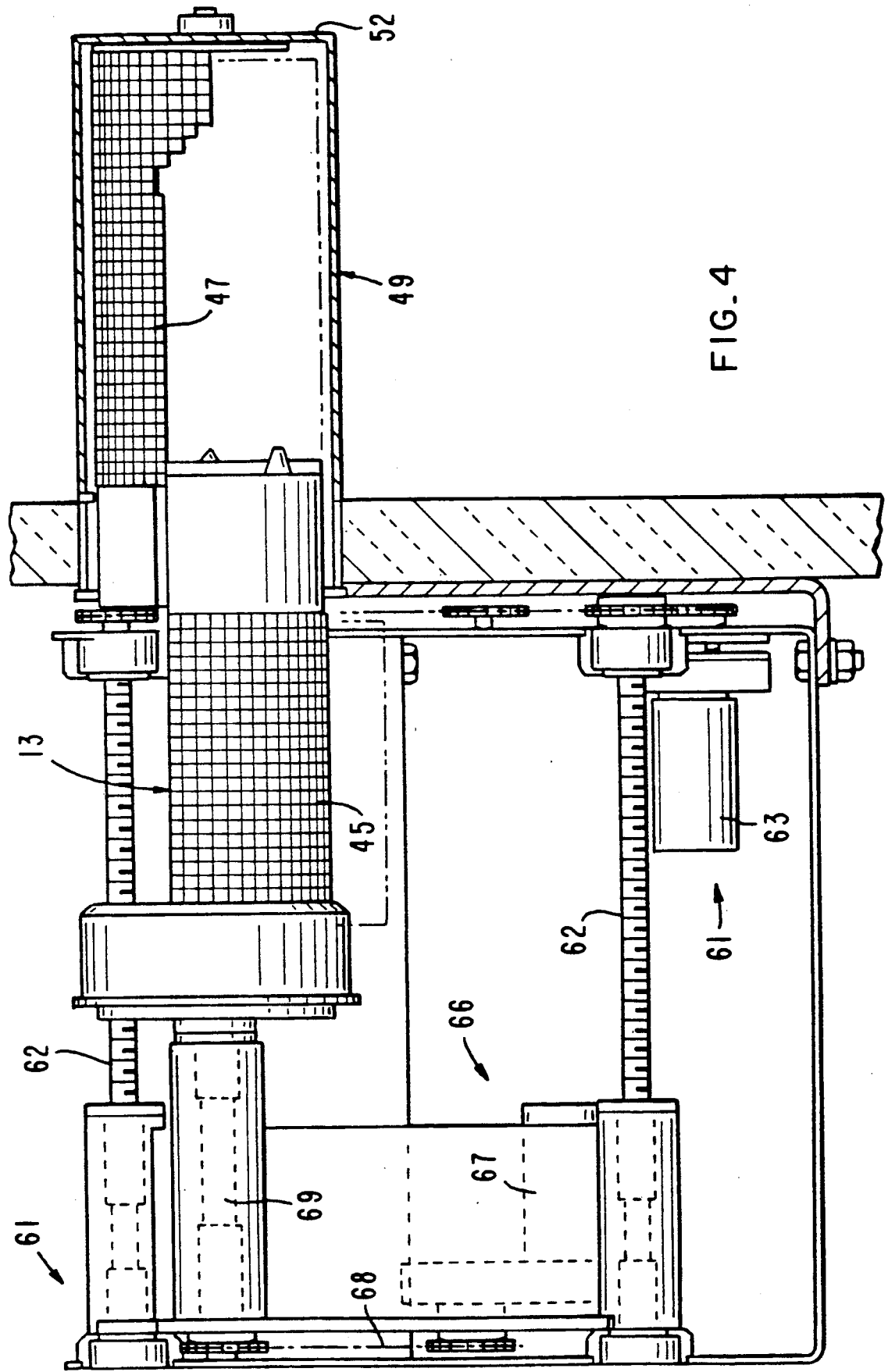
FIG. 4 is a side elevation, partially cut away, showing the retracted position of a basket assembly for use in the system of FIG. 1.

As shown in FIGS. 4-6, the cooking basket assembly 13 is mounted to travel into and out of the air duct assembly 11. In the illustrated embodiment, the basket assembly 13 is comprised of a lower basket portion 45 and a basket cover assembly 47. It should be understood that lower basket 45 is movable in and out of duct assembly 11, while the cover assembly 47 is mounted to be retained within the duct assembly. Preferably, the complete basket assembly 13 has an overall cylindrical shape and its side wall is constructed from an open mesh material. The diameter and length of the basket assembly depends upon the size of the serving portions to be cooked. In practice, the basket assembly is designed so that the pressure drop of air flowing through it does not exceed about 1.25 inches of $H_2O$.

In the preferred embodiment, as shown in FIGS. 4-6, a cylindrical duct section 49 is provided for receiving the basket assembly 13. One end 50 of cylindrical duct section 49 is open for receiving the basket assembly and the other end 52 is closed. Also, openings 53 and 54 (FIG. 6) are formed through duct section 49 generally opposite one another so that the duct section can be interposed in the main duct assembly 11 to extend transverse to the general direction of air flow from the main duct assembly.

As best shown in FIG. 6, the basket assembly 13 includes a circular end member 57 and an annular seal member 58. The function of annular seal member 58, which is mounted to surround the end member, is to seal against the open end of cylindrical duct section 49. Thus, annular seal member 58 provides thermal insulation and minimizes air loss from the cooking system during normal operation. In practice, the annular seal member is a silicone rubber gasket.

Referring now to FIGS. 4-5 and 10, a reciprocating mechanism 61 is mounted for moving the cooking basket assembly 13 into and out of the duct section 49. In the illustrated embodiment, reciprocating mechanism 61 includes two helix screws 62 which are connected at their one ends to the cooking basket assembly and which are arranged to be synchronously rotated for driving the cooking basket assembly into and out of cylindrical duct section 49. Further, reciprocating mechanism 61 preferably includes an electric motor 63 which is mounted for synchronously driving the helix screws. Synchronous rotation is normally required to maintain alignment of the basket assembly.

As best shown in FIGS. 4 and 7, a rotary drive mechanism 66 is mounted to rotate the basket assembly 13. In the illustrated embodiment, the rotary drive mechanism includes an electric motor 63 which is connected, via a pulley drive system 68, to a shaft 69 which is connected to the basket assembly in the direction of its axial centerline. It should be understood that rotation of the basket assembly occurs during cooking, and that partial rotation occurs during loading and unloading when serving portions are loaded into, or discharged from, from the basket assembly.

In operation of the above-describe closed-loop air cooking system, lower basket 45 is moved, by reciprocating mechanism 61, into the end of the cylindrical duct section 49 in an orientation to mate with he basket cover assembly 47 (See FIGS. 6-9). As the lower basket 45 is inserted into duct section 49, the cover assembly slides onto the lower section in the axial direction until the basket assembly is completely covered. At that time, the basket assembly can be fully rotated without discharging food.

In practice, the basket assembly 13, when filled with a pre-measured serving portion, is rotated in the heated air stream for a predetermined period and at a generally constant speed (e.g., twenty revolutions per minute) to uniformly expose the food to the impinging air stream. In practice, the air velocity impinging upon the food during the cooking cycle is controlled at about 2200 ft/min with a volumetric flow rate of about 378 cubic feet per minute (cfm) at about 455 to 465 degrees Fahrenheit to promote rapid cooking without smoking. At the air velocity of about 2200 ft/min, french fried potatoes cook to have delicate and crisp outer layers with moist and hot interiors. Also, the air velocity of about 2200 ft/min is sufficient to entrain loose oil from the fired potatoes during cooking, leaving the cooked product essentially dry to the touch.

After the cooking cycle is completed, reciprocating mechanism 61 is actuated to withdraw the lower basket from the duct section. As lower basket 45 is removed from the cylindrical duct section 49, the basket cover assembly remains within the duct section. More particularly, the cover assembly remains attached and generally in alignment with the lower basket section.

Once the lower basket 45 is withdrawn outside of the cylindrical duct section 49, the basket can be partially rotated for discharging the serving into a dispensing cup for delivery to customers. Then, the basket is returned to its normal position for loading another serving portion of pre-frozen potatoes. In actual use of the closed-loop air cooking system, potatoes for french frying can be loaded, cooked, and unloaded, in a period as short as approximately thirty-five seconds.

At this juncture, it should be noted that the above-described closed-loop air cooking system obviates the need for a hot oil reservoir and its attendant difficulties. As such, the cooking system delivers french fried potatoes that have tender but crisp exteriors, uniformly hot interiors that taste like famous Idaho baked potatoes. Moreover, the french fried potatoes have a uniform and pleasing color, and no external oiliness.

The foregoing has described the principles, preferred embodiments and modes of operation of the present invention. However, the invention should not be construed as limited to the particular embodiments discussed. Instead, the above-described embodiments should be regarded as illustrative rather than restrictive, and it should be appreciated that variations may be made in those embodiments by workers skilled in the art without departing from the scope of present invention as defined by the following claims.

What is claimed is:

1. A closed-loop air cooking system comprising:
   housing means including a closed-loop air duct assembly;
   a cooking basket means mounted for rotation within the air duct assembly;
   fan means for forcing air through the air duct assembly;
   a separator means mounted within the housing means for removing entrained particulates from the air stream that circulates within the air duct assembly; and
   heating means for heating air that circulates within the air duct assembly.

2. A system according to claim 1 wherein the separator means is a cyclone separator and is of substantial thermal mass for heating the circulating air stream.

3. A system according to claim 2 wherein the cyclone separator includes an inlet member for receiving the air stream from the duct assembly, a generally cylindrical body member for receiving air flow from the inlet member and allowing the air stream to circulate in a swirling pattern so that heavier particulates in the flow impinge upon the peripheral wall of the body member, a frusto-conical member communicating with the lower part of the cylindrical body member for gravity discharge of the heavier fraction of materials from the separator, and an inner cylindrical outlet member communicating in a gaseous flow communication with the lower part of the cylindrical body member for discharging the main air stream from the separator.

4. A system according to claim 1 wherein the fan means is mounted for receiving the air stream after particulates have been removed therefrom by the separator means.

5. A system according to claim 1 wherein electrical heating elements are mounted within the interior of separator means near the inlet to fan means.

6. A system according to claim 4 wherein electrical heating elements are mounted within the interior of separator means near the inlet to fan means.

7. A system according to claim 6 wherein electrical heating elements allow the temperature to be elevated to approximately 800° Fahrenheit for sufficient time that the system is self-cleaning.

8. A system according to claim 1 wherein the cooking basket means is mounted to travel into and out of the air duct assembly.

9. A system according to claim 8 wherein the cooking basket means comprises a lower basket portion and a basket cover assembly.

10. A system according to claim 9 wherein the cooking basket means has an overall cylindrical shape and is constructed from an open mesh material.

11. A system according to claim 9 wherein the cooking basket means provides pressure drop of air flowing through the assembly below about 1.25" $H_2O$.

12. A system according to claim 8 further including a cylindrical duct section for receiving the cooking basket means, with one end of the cylindrical duct section being open for receiving the basket assembly and the other end being closed.

13. A system according to claim 12 further including openings formed through the cylindrical duct section generally opposite one another for interposing the duct section in the duct assembly with the cylindrical section extending transverse to the general direction of air flow through the duct assembly.

14. A system according to claim 12 wherein the basket assembly includes a circular end member and an annular seal member mounted to surround the end member for sealing against the open end of the duct section to provide thermal insulation and reduce air loss from the cooking system during normal operation.

15. A system according to claim 12 wherein the basket assembly is movable in and out of the duct section, while the cover assembly is mounted to be retained within the duct section.

16. A closed-loop air cooking system comprising:
   housing means including a closed-loop air duct assembly;
   a cooking basket means mounted for rotation within the air duct assembly;
   reciprocating means for moving the cooking basket means into and out of the air duct assembly;
   fan means for forcing air through the air duct assembly;
   a separator means mounted for removing entrained particulates from the air stream that circulates within the air duct assembly, the separator means being of substantial thermal mass for heating the circulating air stream; and
   heating means for heating air that circulates within the air duct assembly.

17. A system according to claim 16 wherein the cooking basket means comprises a lower basket portion and a basket cover assembly.

18. A system according to claim 17 wherein the lower basket portion is movable in and out of the duct section, while the cover assembly is mounted to be retained within the duct section.

19. A system according to claim 18 wherein the cooking basket means has an overall cylindrical shape and is constructed from an open mesh material.

20. A system according to claim 19 wherein the cooking basket means provides pressure drop of air flowing through the assembly below about 1.25" H₂O.

21. A system according to claim 19 further including a cylindrical duct section for receiving the cooking basket means, with one end of the cylindrical duct section being open for receiving the basket assembly and the other end being closed.

22. A system according to claim 21 further including openings formed through the cylindrical duct section generally opposite one another for interposing the duct section in the duct assembly with the cylindrical section extending transverse to the general direction of air flow through he duct assembly.

23. A system according to claim 22 wherein the basket assembly includes a circular end member and an annular seal member mounted to surround the end member for sealing against the open end of the duct section to provide thermal insulation and reduce air loss from the cooking system during normal operation.

24. A closed-loop air cooking system for use in vending machines that vend foods such as french fried potatoes, comprising:
   housing means including a closed-loop air duct assembly;
   a cooking basket means mounted for rotation within the air duct assembly such that substantially all of the air passing through the air duct assembly passes through the cooking basket means;
   fan means for forcing air through the closed-loop air duct assembly, during the cooking cycle, at about 2200 ft/min with a volumetric flow rate of about 300 cubic feet per minute;
   a separator means mounted within the housing means for removing entrained particulates from the air stream that circulates within the air duct assembly; and
   heating means for heating air that circulates within the air duct assembly, during a cooking cycle, at about 455 to 465 degrees Fahrenheit.

25. A system according to claim 24 wherein the separator means is a cyclone separator and is of substantial thermal mass for providing heat to the circulating air stream.

26. A system according to claim 25 wherein the cyclone separator includes an inlet member for receiving the air stream from the duct assembly, a generally cylindrical body member for receiving air flow from the inlet member and allowing the air stream to circulate in a swirling pattern so that heavier particulates in the flow impinge upon the peripheral wall of the body member, a frusto-conical member communicating with the lower part of the cylindrical body member for gravity discharge of the heavier fraction of materials from the separator, and an inner cylindrical outlet member communicating with the lower part of the cylindrical body member for discharging the main air stream from the separator.

27. A system according to claim 1 wherein:
   the cooking basket means is mounted within the air duct assembly such that substantially all of the air passing through the air duct assembly passes through the cooking basket means;
   the fan means forces air through the closed-loop air duct assembly, during the cooking cycle, at about 2200 ft/min with a volumetric flow rate of about 300 cubic feet per minute; and
   the heating means heats the circulating air, during a cooking cycle, to about 455 to 465 degrees Fahrenheit.

28. A system according to claim 16 wherein:
   the cooking basket means is mounted within the air duct assembly such that substantially all of the air passing through the air duct assembly passes through the cooking basket means;
   the fan means forces air through the closed-loop air duct assembly, during the cooking cycle, at about 2200 ft/min with a volumetric flow rate of about 300 cubic feet per minute; and the heating means heats the circulating air, during a cooking cycle, to about 455 to 465 degrees Fahrenheit.

* * * * *